(12) United States Patent
Puliatti et al.

(10) Patent No.: US 8,391,830 B1
(45) Date of Patent: Mar. 5, 2013

(54) MOBILE PHONE EMERGENCY SERVICES

(75) Inventors: Dante Puliatti, Shawnee, KS (US); Bryan Timothy Barbee, Olathe, KS (US); Jason Peter Sigg, Olathe, KS (US); Steven Earl Brigmann, Overland Park, KS (US); Andrew Mark Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 252 days.

(21) Appl. No.: 12/968,850

(22) Filed: Dec. 15, 2010

(51) Int. Cl.
*H04W 88/02* (2009.01)
(52) U.S. Cl. .................... 455/404.1; 455/406
(58) Field of Classification Search ........... 455/404.1, 455/41.2, 406, 422.1; 370/230, 241, 252; 726/1, 2
See application file for complete search history.

(56) References Cited

U.S. PATENT DOCUMENTS

| | | | |
|---|---|---|---|
| 2007/0201624 A1 | 8/2007 | Testino | |
| 2012/0192249 A1* | 7/2012 | Raleigh | 726/2 |
| 2012/0201133 A1* | 8/2012 | Raleigh | 370/230 |
| 2012/0214441 A1* | 8/2012 | Raleigh | 455/406 |

* cited by examiner

*Primary Examiner* — Diane Mizrahi

(57) ABSTRACT

A mobile phone is configured to detect emergency events and control services enabled on the mobile phone in response to the emergency events. The mobile phone may be configured to detect events such as the mobile phone being turned off or a battery being removed. When the mobile phone detects an event, the mobile phone enables one or more emergency services on the mobile phone to collect and transmit data that may be used by emergency personnel. Other services may be disabled on the mobile phone to conserve battery power.

20 Claims, 4 Drawing Sheets

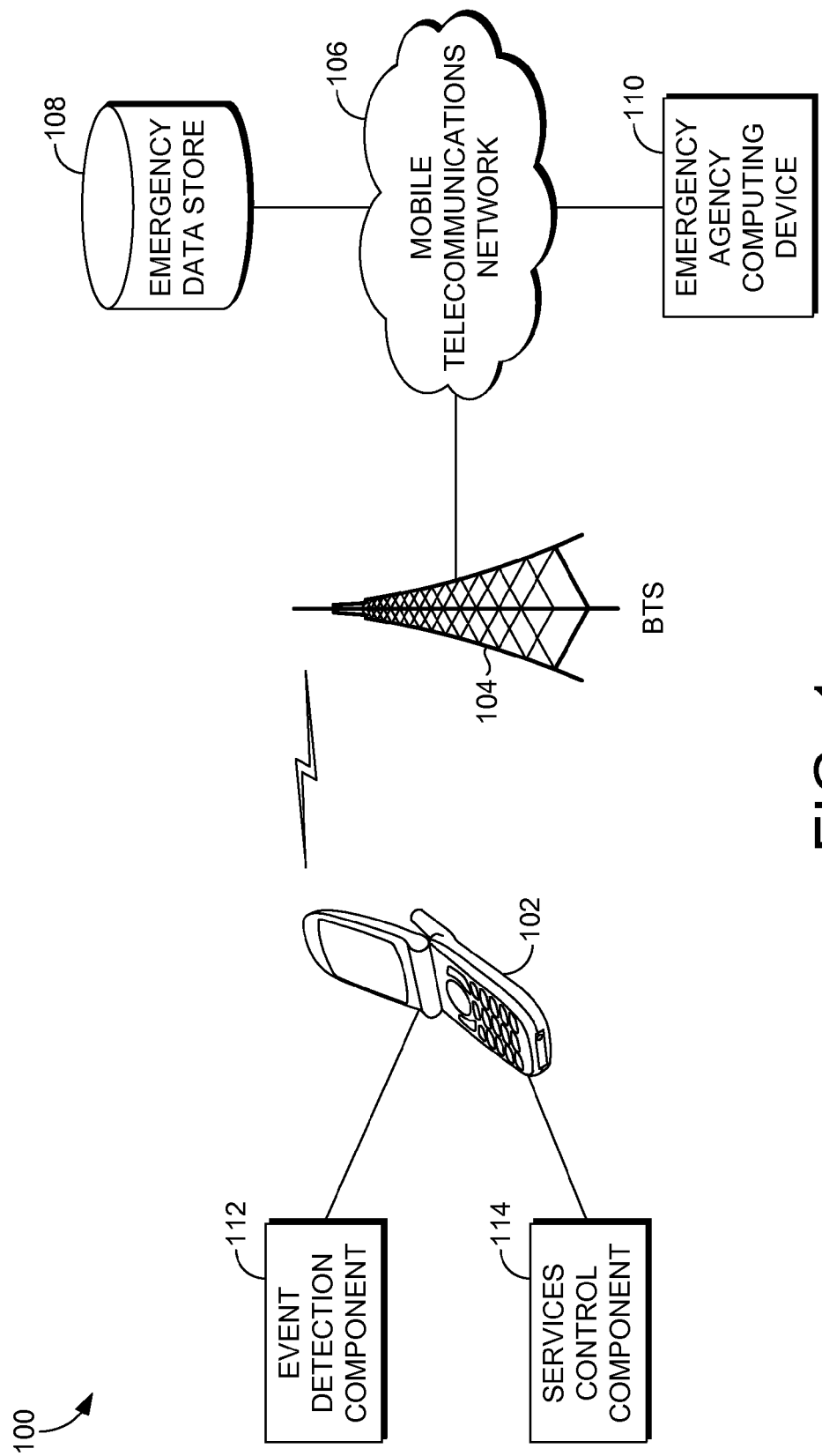

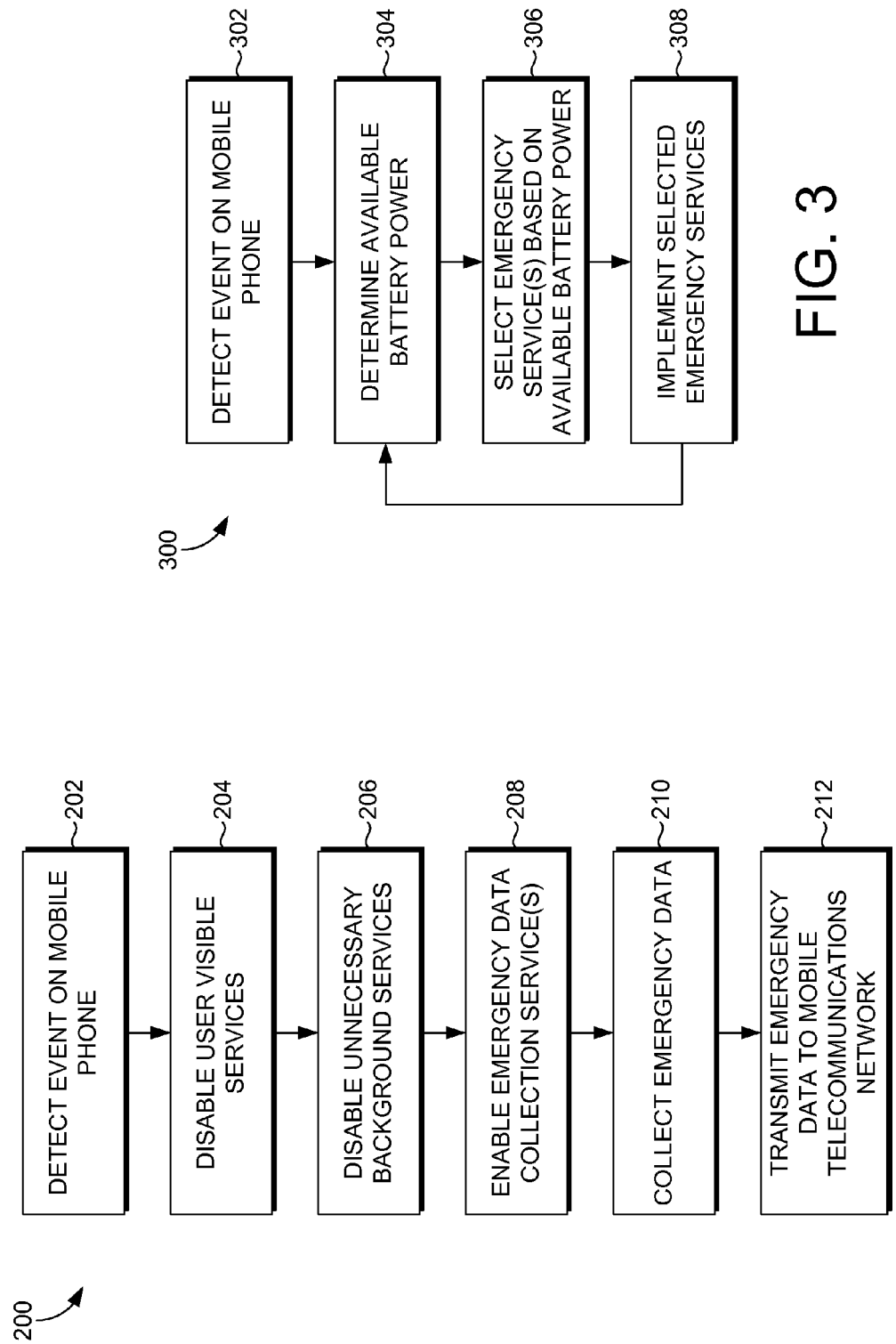

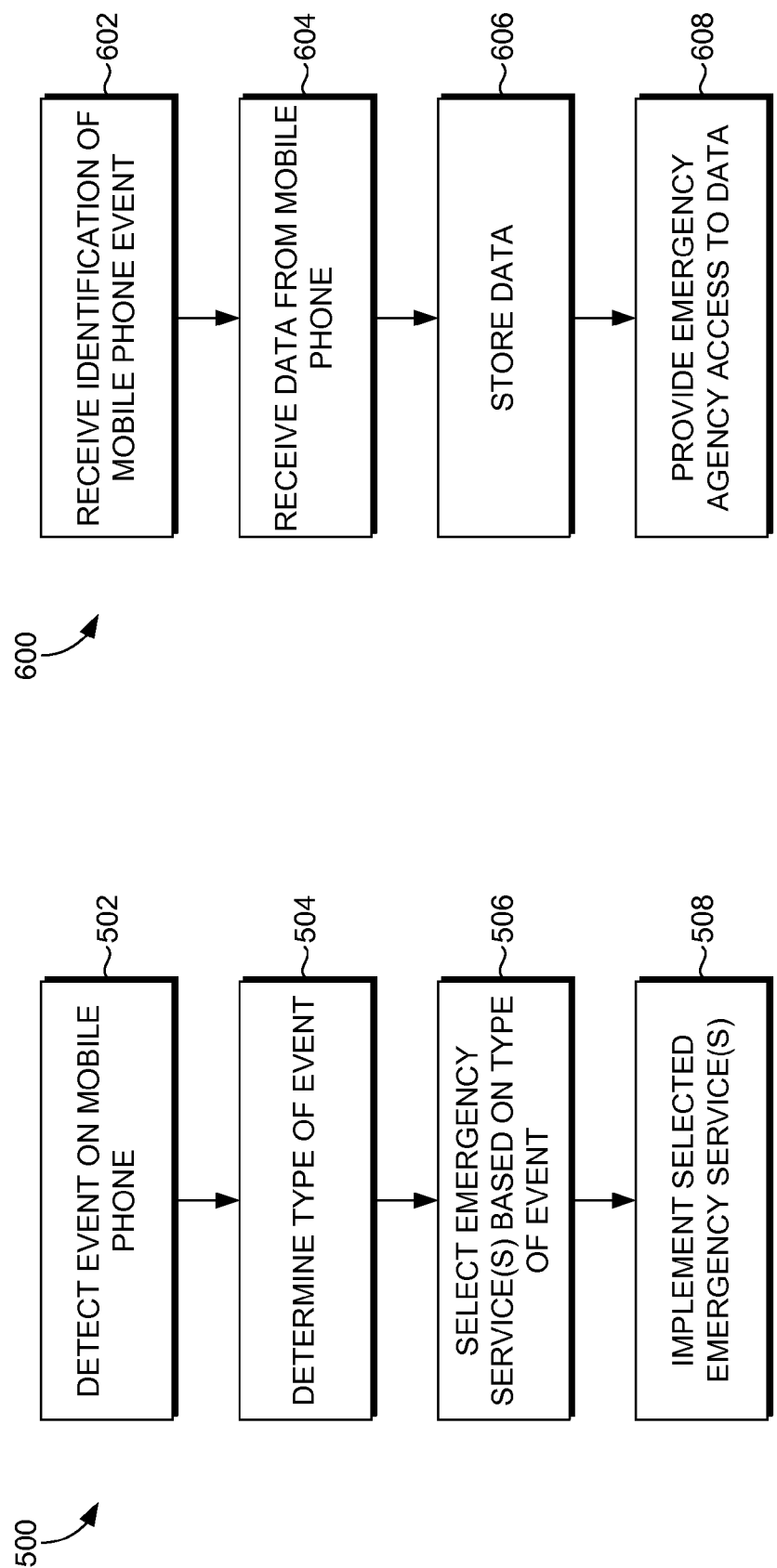

MOBILE PHONE EMERGENCY SERVICES

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

Embodiments of the present invention provide for, among other things, activation of emergency services for a mobile phone in response to detecting an event on the mobile phone that may be indicative of an emergency situation. In embodiments, a mobile phone may be configured to monitor for a number of events that may signal an emergency situation. For instance, the events may include the mobile phone being turned off, a battery being removed from the mobile phone, the mobile phone being damaged, or an emergency phone call (e.g., a 911 call) being disconnected. In response to detecting the event, the mobile phone may enable data collection services on the mobile phone to collect and transmit data that may be of assistance to emergency agency (e.g., law enforcement) in response to an emergency situation. This may include enabling a microphone to collect audio, enabling a camera to capture video and/or still images, and/or enabling a GPS service to collect location information. The data collected on the mobile phone may be transmitted from the mobile phone to a mobile telecommunications network and provided to an emergency agency.

Accordingly, in one aspect, an embodiment of the invention is directed to one or more computer storage media storing computer useable instructions that, when used by a mobile phone, cause the mobile phone to perform a method. The method includes detecting an event on the mobile phone, the event being one of a plurality of pre-defined events. The method also includes in response to detecting the event, disabling unnecessary background services on the mobile phone, and enabling one or more data collection services on the mobile phone. The method further includes collecting data on the mobile phone using the one or more data collection services. The method still further includes communicating the data from the mobile phone to a mobile telecommunications network.

In another aspect of the invention, an embodiment is directed to one or more computer storage media storing computer useable instructions that, when used by a mobile phone, cause the mobile phone to perform a method. The method includes detecting an event on the mobile phone that may be indicative of an emergency. In response to detecting the event, the method includes disabling all user visible services and unnecessary background services and determining battery power available to the mobile phone. If the battery power available to the mobile phone is below a threshold, the method includes placing the mobile phone in idle mode such that the mobile phone responds to network pings. If the battery power available to the mobile phone is above the threshold, the method includes enabling one or more data collection services on the mobile phone, collecting data on the mobile phone using the one or more data collection services, and communicating the data from the mobile phone to a mobile telecommunications network.

A further embodiment of the invention is directed to a mobile phone including at least one processor and comprising an event detection component and a services control component. The event detection component detects an event on the mobile phone, the event being one of a plurality of pre-defined events. The services control component controls services on the mobile phone in response to detection of the event on the mobile phone, the services control component being configured to disable all user visible services on the mobile phone and all unnecessary background services, the services control component also being configured to enable one or more data collection services on the mobile phone.

BRIEF DESCRIPTION OF THE DRAWINGS

Illustrative embodiments of the present invention are described in detail below with reference to the attached drawing figures, and wherein:

FIG. 1 is a block diagram of an exemplary system in which embodiments of the present invention may be employed;

FIG. 2 is a flow diagram showing a method for controlling services on a mobile phone in response to an emergency event in accordance with an embodiment of the present invention;

FIG. 3 is a flow diagram showing a method for selecting emergency services on a mobile phone based on available battery power in accordance with an embodiment of the present invention;

FIG. 5 is a flow diagram showing a method for selecting emergency services on a mobile phone based on the type of emergency event detected in accordance with an embodiment of the present invention; and FIG. 6 is a flow diagram showing a method for handling emergency data for a mobile phone in accordance with an embodiment of the present invention.

DETAILED DESCRIPTION

Figure 4:
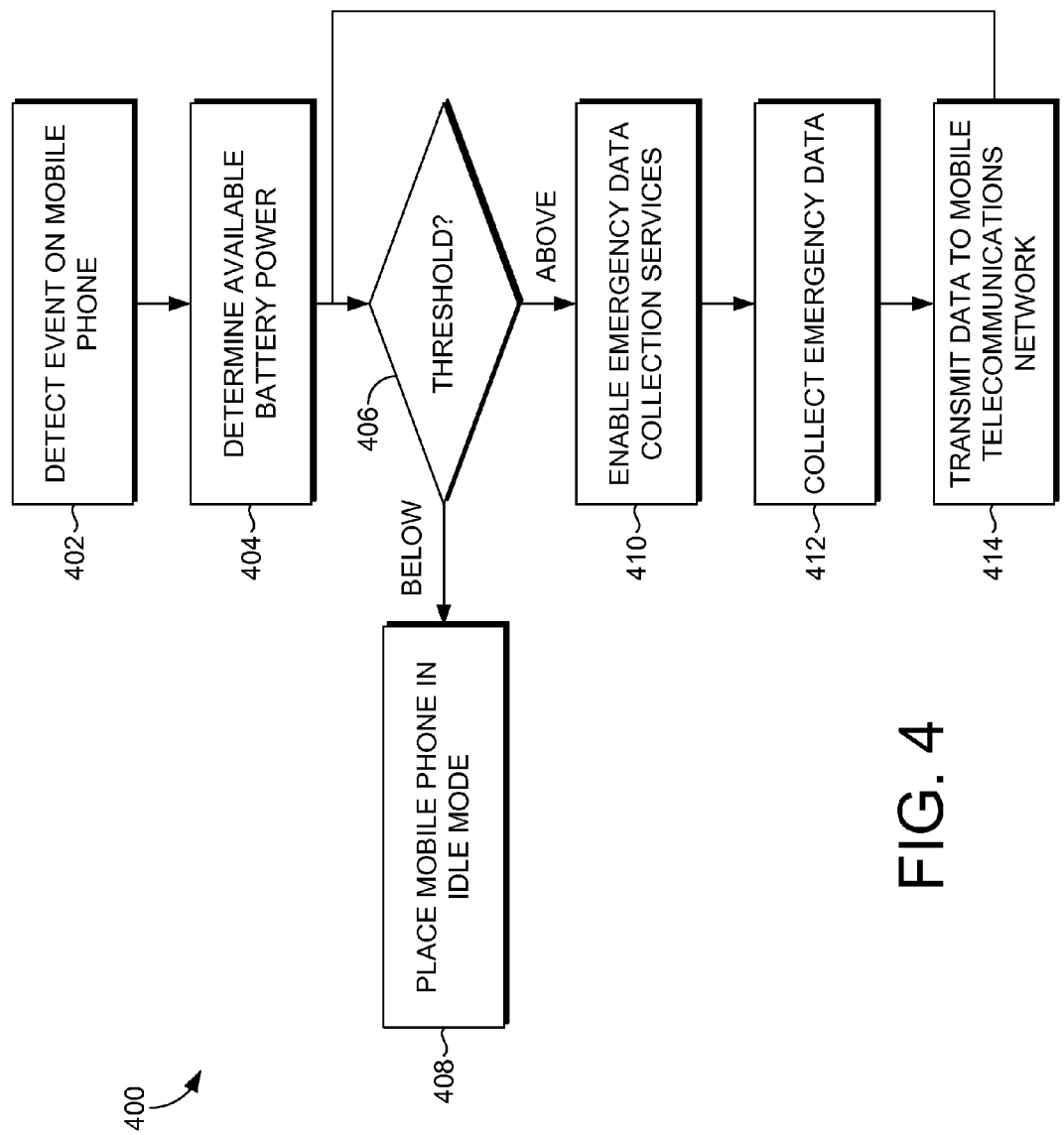
FIG. 4 is a flow diagram showing a method for determining whether to enable data collection services or place a mobile phone in idle mode in response to an emergency event in accordance with an embodiment of the present invention.

In accordance with embodiments of the present invention, a mobile phone may provide emergency services in response to detecting an emergency event. The mobile phone may be configured to monitor for a number of different events that may be indicative of the user experiencing an emergency situation, such as being the victim of a crime. For instance, a perpetrator may take the user's mobile phone and turn the mobile phone off, remove the mobile phone's battery, attempt to damage the phone, or disconnect an emergency call that the user initiated.

If the mobile phone detects one of these events, the mobile phone may be configured to enable one or more emergency services on the mobile phone while disabling other services on the mobile phone to conserve battery power. As used herein, the term "services" refers to any application or process running on the mobile phone. The emergency services enabled on the mobile phone may include data collection services available on the mobile phone. As used herein, the term "data collection services" refers to any service that may collect data on the mobile phone that may be transmitted to and used by emergency personnel. By way of example only and not limitation, the data collection services enabled on the mobile phone may include the microphone to capture audio, the camera to collect video and/or still images, and GPS services to collect location information. In some embodiments, the emergency service employed by the mobile phone may be placing the mobile phone in idle mode to respond to network pings so the network may estimate a location of the mobile phone.

As can be understood, a number of different emergency services may be available to the mobile phone. In some embodiments of the present invention, the emergency services that are enabled in response to a particular event may be selected based on the battery power available to the mobile phone. In some embodiments, the emergency services enabled may be selected based on the type of event detected by the mobile phone.

As noted above, the mobile phone may disable some services in response to an event to conserve battery power. The services disabled on the mobile phone may include user visible services and unnecessary background services. As used herein, the term "user visible services" refers to any service on the mobile phone that may be visible to the user, such as the screen and buttons. As used herein, the term "unnecessary background services" refers to any services on the mobile phone that are not visible to the user and are unnecessary to emergency data collection and/or transmission of emergency data.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| AMPS | Advanced Mobile Phone System |
| BTS | Base Transceiver Station |
| CDMA | Code Division Multiple Access |
| GSM | Global System for Mobile communications (Groupe Spécial Mobile) |
| HSDPA | High-Speed Downlink Packet Access |
| LTE | Long Term Evolution |
| TDMA | Time Division Multiple Access |
| WiMAX | Worldwide Interoperability for Microwave Access |

Further, various technical terms are used throughout this description. An illustrative resource that fleshes out various aspects of these terms can be found in Newton's Telecom Dictionary by H. Newton, 25th Edition (2009).

Embodiments of the present invention may be embodied as, among other things: a method, system, or set of instructions embodied on one or more computer-readable media. Computer-readable media comprise physical storage devices and include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to FIG. 1, a block diagram is shown of an exemplary system 100 in which exemplary embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As shown in FIG. 1, the system 100 may include, among other components, a mobile phone 102, a base transceiver station (BTS) 104, a mobile telecommunications network 106, an emergency data store 108, and an emergency agency computing device 110.

The mobile phone 102 may be any type of device capable of communicating wirelessly with the mobile telecommunications network 106 to provide voice and/or data services to the mobile phone 102. To provide wireless service to the mobile phone 102, the system 100 may include a BTS 104, which provides a wireless coverage area. The BTS 104 may communicate over a wireless air interface with the mobile phone 102. The communication between the BTS 104 and the mobile phone 102 may occur in a digital format, such as CDMA, TDMA, GSM, 3G, or 802.11x, WiMAX, LTE, LTE Advanced, HSDPA, HSDPA+, or 4G, or may occur in an analog format, such as AMPS. Alternatively or additionally, the system 100 may include other network elements for providing mobile phone 102 access to the mobile telecommunications network 106.

In accordance with embodiments of the present invention, the mobile phone 102 is configured to detect an event that may be indicative of an emergency situation and to collect and transmit data to the mobile telecommunications network 106 when an emergency event is detected. As shown in FIG. 1, the mobile phone 102 may include an event detection component 112 and a services control component 114.

The event detection component 112 is operative to detect an event on the mobile phone 102 that may be indicative of an emergency situation. In some embodiments, a number of conditions may be pre-defined as corresponding with potential emergency situations, and the event detection component 112 monitors the mobile phone 112 for the presence of any of the pre-defined conditions. By way of example only and not limitation, these conditions may include the mobile phone 102 being powered off, the main battery (i.e., the removable battery) being removed from the mobile phone 102, damage to the mobile phone 102, an attempt to damage the mobile phone 102, or an emergency services call (e.g., a 911 call) being disconnected. Damage to the mobile phone 102 or an attempt to damage the mobile phone may be detected, for instance, by employing motion detecting devices within the mobile phone 102, such as an accelerometer.

If an event is detected by the event detection component 112, the services control component 114 operates to control the services provided by the mobile phone 102. This may include activating data collection services on the mobile phone in response to detecting an emergency event. The data collection services may include any of a number of different services available on the mobile phone 102 for collecting data that may be of assistance in the event of an emergency. By way of example, this may include turning on the microphone on the mobile phone 102 to collect audio. As another example, this may include enabling a camera on the mobile phone 102 to capture video and/or still images. As a further example, a GPS service may be enabled on the mobile phone 102 to collect location information. Of course, the service(s) enabled in response to detection of an emergency event may depend on the features available on the mobile phone 102. In further embodiments, instead of enabling emergency data collection services on the mobile phone 102, the mobile phone 102 may be placed in an idle mode such that the mobile phone 102 may respond to network pings. The mobile telecommunications network 106 may use the mobile phone's responses to derive location information for the mobile phone 102.

In instances in which multiple data collection services are available to the mobile phone 102, the data collection services that are enabled in response to detecting an emergency event may be variable based on any of several inputs. For instance, in some embodiments, the data collection services enabled on the mobile phone 102 may be selected and enabled based on battery power available to the mobile phone 102. In particular, some data collection services may consume more battery power than other data collection services. Accordingly, if sufficient battery power is available to the mobile phone 102, the data collection services that consume more battery power may be enabled, while if battery power is low, only data collection services that consume less battery power may be enabled. In some embodiments, if battery power is low enough, the mobile phone 102 may be placed in an idle mode while other services are disabled.

In further embodiments, the emergency services enabled on the mobile phone 102 may depend upon the type of event detected by the mobile phone. In particular, some event types may be more likely a result of an emergency situation. For instance, an emergency phone call being disconnected may be more likely the result of an emergency situation than the mobile phone 102 being turned off. Therefore, it may be desirable to collect more data for some events and less data for other events.

In some embodiments, in addition to enabling emergency services on the mobile phone 102, all user visible services and/or unnecessary background services may be disabled when the event collection component 112 detects an emergency event. User visible services include any service that may be visible to the user, such as the screen and buttons. Unnecessary background services include any applications or processes running on the mobile phone that are not visible to the user and are unnecessary to emergency data collection and/or transmission of emergency data to the mobile telecommunications network 108. Disabling the user visible services and/or unnecessary background services helps conserve battery life for use for emergency data collection and transmission purposes. Additionally, disabling user visible services may make it appear that the mobile phone is no longer operation. As such, it may be less likely that a perpetrator would attempt to further damage the mobile phone or discard the mobile phone such that it is no longer with the user.

To facilitate providing emergency services when an event is detected, the mobile phone 102 may include an emergency, back-up battery. This emergency battery would be in addition to the main battery such that even if the main battery was to have low power, was removed, was damaged, or otherwise was unable to power emergency services, the emergency battery could provide power for such services.

While the main battery is often removable from the mobile phone 102, in embodiments, the emergency battery may be hardwired in the mobile phone 102. Additionally, the emergency battery may be located in the mobile phone 102 such that it is not easily accessible. This would reduce the ability for a perpetrator to discover and remove the emergency battery.

The emergency battery may be sized as to reduce additional weight to the mobile phone 102 while still being able to provide a minimum amount of emergency services (e.g., 5 minutes). In some embodiments, the emergency battery may receive priority charge when the mobile phone 102 is plugged in for charging. That is, the emergency battery is charged before the main battery is charged. In further embodiments, the emergency battery may receive charge from the main battery as needed.

Emergency data collected for the mobile phone 102 in response to an event may be stored by the mobile telecommunications network 106 in the emergency data store 108. The data may be encrypted on the emergency data store 102 for privacy purposes. Additionally, the data may be maintained for a certain period of time and then discarded.

The mobile service provider may provide access to the emergency data store 108 to an emergency agency, such as law enforcement. As such, the system 100 illustrates an emergency agency computing device 110 that is able to communicate with the mobile telecommunications network 106 to access emergency data in the emergency data store 108.

The mobile telecommunications network 108 may automatically provide a notification of an event to the emergency services computer device 110. In some embodiments, whether an alert is provided varies on the type of event detected for the mobile phone 102. For instance, an emergency call being disconnected may result in an alert being automatically provided, while the mobile phone 102 being turned off may not.

In further embodiments, emergency data may be forwarded to the emergency agency with or without storage by the mobile telecommunications network 108. As such, the emergency agency may receive the emergency data without having to access the data from the emergency data store 108.

Referring now to FIG. 2, a flow diagram is provided that illustrates a method 200 for engaging emergency services on a mobile phone in response to an emergency event in accordance with an embodiment of the present invention. Initially, as shown at block 202, an event is detected on the mobile phone. As noted above, the mobile phone may be configured to detect any number of different events as possible emergency situations. For instance, these may include the mobile phone being turned off, the main battery being removed from the mobile phone, damage to the mobile phone, and/or an emergency phone call being disconnected.

In response to detecting the event, all user visible services are disabled, as shown at block 204. Additionally, all unnecessary background services are disabled, as shown at block 206. As discussed previously, disabling user visible services and unnecessary background services helps to conserve battery power. Additionally, disabling user visible services makes it appear that the mobile phone is no longer operating.

One or more emergency data collection services are enabled in response to detecting the event, as shown at block 208. The emergency data collection services include any service available on the mobile phone that may be used to collect data that may be of assistance during an emergency situation. By way of example only and not limitation, the emergency data collections services may include turning on the mobile phone's microphone to collect audio, engaging the mobile phone's camera to capture video and/or still images, or turning on the mobile phone's GPS services to collect location information.

Emergency data is collected at block 210 based on the emergency data collections services that were enabled at block 208. For instance, the data may include audio, video, still images, and/or location information. The data is transmitted from the mobile phone to the mobile telecommunications network, as shown at block 212.

As previously described, in some embodiments, the emergency services that are enabled on the mobile phone may be based on the battery power available to the mobile phone. With reference to FIG. 3, a flow diagram is provided that illustrates a method 300 for enabling emergency services on a mobile phone based on available battery power. As shown at block 302, an event is detected on the mobile phone that triggers emergency services on the mobile phone. The battery power available to the mobile phone is determined at block 304. If the main battery is available to the mobile phone, this may include power from both the main battery and the emergency battery. If the main battery is not available (e.g., the battery was removed or damaged), this may include power from the backup battery.

One or more emergency services are selected at block 306 based on the battery power determined to be available to the mobile phone at block 304. In particular, some emergency services may consume more battery power than other emergency services. For instance, capturing and transmitting video may consume more battery power than simply capturing and transmitting a still image. Accordingly, emergency services that consume more power may only be engaged if sufficient battery power is available. Additionally, the different emergency collection services may have different priorities. For instance, it may be more desirable to collect location information than to collect video. As such, emergency services may be engaged based on importance of services and available battery power. If sufficient battery power is available, all emergency services may be engaged on the mobile phone, while only preferred emergency service(s) are engaged if battery power is insufficient. In some instances, there may be insufficient battery power to engage data collection services on the mobile phone. In such instances, the emergency service selected may be to place the mobile phone in an idle mode. This is discussed in further detail below with reference to FIG. 4.

The emergency services to engage based on available battery power may be determined using one or more thresholds. For example, all emergency services may be implemented if battery power is above a first threshold, certain emergency service may be implemented if battery power is below the first threshold but above a second threshold, and only idle mode may be implemented below the second threshold. The thresholds may be predetermined or may be dynamically determined by the mobile phone, for instance, based on current and/or historical operational parameters. Any and all such variations are contemplated to be within the scope of embodiments of the present invention.

The selected emergency services are implemented at block 308. This may include capturing data and transmitting the data to the mobile telecommunications network if emergency data collection services are selected. This may alternatively include placing the mobile phone in idle mode if battery power is low.

As shown by the return from block 308 to block 304, the mobile phone may continue to monitor the available battery power and adjust the emergency services implemented based on changes in battery power. For instance, when an event is first detected, the mobile phone may determine that sufficient battery power is available to engage all emergency data collection services. After those services are engaged and data is collected and transmitted, the mobile phone may determine that less battery power is now available and may engage only a portion of the data collection services. After collecting and transmitting more data, the mobile phone may determine that battery power is low enough such that the mobile phone should be placed in idle mode.

Turning to FIG. 4, a flow diagram is provided that illustrates a method 400 for determining whether to engage emergency data collection services or to place a mobile phone in idle mode in accordance with an embodiment of the present invention. As shown at block 402, an event is detected on the mobile phone that triggers emergency services on the mobile phone. Battery power available to the mobile phone is determined at block 404. As shown at block 406, the available battery power is compared against a threshold. This threshold may be pre-determined or may be dynamically determined by the mobile phone based on current and/or historical operational performance.

If the available battery power is below the threshold, the mobile phone is placed in idle mode, as shown at block 408. In idle mode, the mobile phone may simply respond to network pings. All other services are disabled on the mobile phone. In some embodiments, in addition to placing the mobile phone in idle mode, the mobile phone may provide an indication to the mobile telecommunications network that an event has been detected by the mobile phone. As such, the network may be able to use the mobile phone's responses to network pings to estimate location information for the mobile phone.

Alternatively, if the available battery power is above the threshold, one or more emergency data collection services are enabled on the mobile phone, as shown at block 410. The emergency data collection services selected and enabled on the mobile phone may be determined based on the available battery power as was discussed above with reference to FIG. 3. Emergency data is collected on the mobile phone, as shown at block 412, and the data is transmitted to the mobile telecommunications network, as shown at block 414.

Each of the different types of events that may be trigger emergency service on a mobile phone may correspond with a different likelihood of whether an emergency situation is present. For instance, an emergency phone call being disconnected may be more likely to be a result of an emergency situation than the mobile phone simply being turned off. Accordingly, in some embodiments of the present invention, the emergency services engaged by the mobile phone may be determined based on the type of event that is detected. This is illustrated in the method 500 shown in FIG. 5.

As shown at block 502, an event is detected on a mobile phone. The type of event that is detected is determined at block 504. By way of example only and not limitation, the different types of events that may be detected may include the mobile phone being turned off, the removable battery being removed from the mobile phone, the mobile phone being damaged, or an emergency phone call being disconnected.

One or more emergency services are selected based on the type of event detected by the mobile phone, as shown at block 508. The selected emergency services are implemented at block 510. This may include collecting data on the mobile phone and transmitting the data to the mobile telecommunications network.

Although the selection of emergency services to engage on a mobile phone based on available battery power and event type were discussed above with reference to different flow diagrams, it should be understood that the emergency services could be selected based on both available battery power and event type in some embodiments. Additionally, other factors may be considered when selecting and implementing emergency services on a mobile phone in response to an event. Any and all such variations are contemplated to be within the scope of embodiments of the present invention.

When emergency services are engaged on the mobile phone in response to an event, emergency data is transmitted from the mobile phone to the mobile telecommunications network or otherwise collected by the mobile telecommunications network. FIG. 6 provides a flow diagram that illustrates a method for handling emergency data for a mobile phone in accordance with an embodiment of the present invention. As shown at block 602, an identification of an event on the mobile phone is received by the mobile telecommunications network from the mobile phone. Additionally, emergency data is received, as shown at block 604. As discussed previously, the emergency data may include any data collected by the mobile phone, such as audio, video, still images, and/or location information. In some instances, the emergency data may be data collected by the network, such as location information estimated by the network based on the mobile phone responding to network pings.

Emergency data for the mobile phone is stored in association with an identifier for the mobile phone, as shown at block 606. The stored data may be encrypted for security purposes. Access to the mobile phone's stored emergency data may be provided to the appropriate law enforcement or other emergency agency (e.g., fire, ambulance, etc.), as shown at block 608. As such, the law enforcement or other emergency agency may employ the emergency data for responding to an emergency situation if needed. This may include, for instance, determining whether an emergency situation is in fact present, the user's location, and/or the identity of a perpetrator.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more computer storage media storing computer useable instructions that, when executed by a mobile phone, cause the mobile phone to perform a method comprising:
   detecting an event on the mobile phone, the event corresponding with one of a plurality of conditions of the mobile phone pre-defined as being indicative of an emergency;
   in response to detecting the event, disabling unnecessary background services on the mobile phone, and enabling one or more data collection services on the mobile phone, the one or more data collection services comprising one or more services on the mobile phone operable to collect data using a component of the mobile phone;
   collecting data on the mobile phone using the one or more data collection services; and
   communicating the data from the mobile phone to a mobile telecommunications network.

2. The one or more computer storage media of claim 1, wherein the event comprises at least one selected from the following: the mobile phone is turned off, a battery is removed from the mobile phone, damage to the mobile phone, and an emergency phone call is disconnected.

3. The one or more computer storage media of claim 1, wherein enabling the one or more data collection services on the mobile phone comprises at least one selected from the following: enabling a microphone on the mobile phone to capture audio, enabling a camera on the mobile phone to capture video or still images, and enabling a GPS service on the mobile phone to capture location information.

4. The one or more computer storage media of claim 1, wherein the method further comprises disabling all user visible services on the mobile phone in response to detecting the event on the mobile phone.

5. The one or more computer storage media of claim 1, wherein enabling the one or more data collection services on the mobile phone comprises:
   determining battery power available to the mobile phone; and
   selecting the one or more data collection services based on the battery power available to the mobile phone.

6. The one or more computer storage media of claim 1, wherein enabling the one or more data collection services on the mobile phone comprises enabling a first data collection service, and wherein the method further comprises:
   periodically determining battery power available to the mobile phone; and
   disabling the first data collection service and enabling a second data collection service on the mobile phone when the battery power available to the mobile phone reaches a threshold.

7. The one or more computer storage media of claim 1, wherein the method further comprises:
   determining that battery power available to the mobile phone has reached a threshold;
   disabling the one or more data collection services on the mobile phone; and
   placing the mobile phone in idle mode such that the mobile phone responds to network pings.

8. The one or more computer storage media of claim 1, wherein enabling the one or more data collection services on the mobile phone comprise:
   determining a type of event for the event detected on the mobile phone; and
   selecting the one or more data collection services based on the type of event detected.

9. One or more computer storage media storing computer useable instructions that, when executed by a mobile phone, cause the mobile phone to perform a method comprising:
   detecting an event on the mobile phone, the event corresponding with a condition of the mobile phone pre-defined as being indicative of an emergency;
   in response to detecting the event:
      disabling all user visible services and unnecessary background services on the mobile phone;
      determining battery power available to the mobile phone;

when the battery power available to the mobile phone is below a threshold, placing the mobile phone in idle mode such that the mobile phone responds to network pings; and when the battery power available to the mobile phone is above the threshold;

enabling one or more data collection services on the mobile phone, the one or more data collection services comprising one or more services on the mobile phone operable to collect data using a component of the mobile phone, collecting data on the mobile phone using the one or more data collection services, and communicating the data from the mobile phone to a mobile telecommunications network.

10. The one or more computer storage media of claim 9, wherein the event comprises at least one selected from the following: the mobile phone is turned off, a battery is removed from the mobile phone, damage to the mobile phone, and an emergency phone call is disconnected.

11. The one or more computer storage media of claim 9, wherein when the battery power available to the mobile phone is above the threshold, enabling the one or more data collection services on the mobile phone comprises at least one selected from the following: enabling a microphone on the mobile phone to capture audio, enabling a camera on the mobile phone to capture video or still images, and enabling a GPS service on the mobile phone to capture location information.

12. The one or more computer storage media of claim 9, wherein when the battery power available to the mobile phone is above the threshold, enabling the one or more data collection services on the mobile phone comprises selecting the one or more data collection services based on the battery power available to the mobile phone.

13. The one or more computer storage media of claim 9, wherein when the battery power available to the mobile phone is above the threshold, enabling the one or more data collection services on the mobile phone comprises enabling a first data collection service, and wherein the method further comprises:

periodically determining battery power available to the mobile phone; and disabling the first data collection service and enabling a second data collection service on the mobile phone when the battery power available to the mobile phone reaches a second threshold.

14. The one or more computer storage media of claim 9, wherein when the battery power available to the mobile phone is above the threshold, the method further comprises:

determining that battery power available to the mobile phone has reached the threshold;

disabling the one or more data collection services on the mobile phone; and placing the mobile phone in idle mode such that the mobile phone responds to network pings.

15. The one or more computer storage media of claim 9, wherein when the battery power available to the mobile phone is above the threshold, enabling the one or more data collection services on the mobile phone comprise:

determining a type of event for the event detected on the mobile phone; and selecting the one or more data collection services based on the type of event detected.

16. A mobile phone including at least one processor, the mobile phone comprising:

an event detection component that detects an event on the mobile phone, the event corresponding with one of a plurality of conditions of the mobile phone pre-defined as being indicative of an emergency;

a services control component that controls services on the mobile phone in response to detection of the event on the mobile phone, the services control component being configured to disable all user visible services on the mobile phone and all unnecessary background services on the mobile phone, the services control component also being configured to enable one or more data collection services on the mobile phone, the one or more data collection services comprising one or more services on the mobile phone operable to collect data using a component of the mobile phone.

17. The mobile phone of claim 16, wherein the event comprises at least one selected from the following: the mobile phone is turned off, a battery is removed from the mobile phone, damage to the mobile phone, and an emergency phone call is disconnected.

18. The mobile phone of claim 16, wherein the services control component is configured to enable at least one selected from the following: a microphone on the mobile phone to capture audio, a camera on the mobile phone to capture video or still images, and a GPS service on the mobile phone to capture location information.

19. The mobile phone of claim 16, wherein the services control component selects the one or more data collection services to enable based on battery power available to the mobile phone.

20. The mobile phone of claim 16, wherein the services control component selects the one or more data collection services to enable based on a type of event for the event detected by the event detection component.

\* \* \* \* \*